United States Patent [19]
Kikuchi et al.

[11] Patent Number: 5,662,440
[45] Date of Patent: Sep. 2, 1997

[54] ROUTER ATTACHMENT

[75] Inventors: Naoki Kikuchi, Chandler; Kenneth M. Brazell, Phoenix, both of Ariz.; Shumi Akazawa, Fuchu, Japan

[73] Assignee: Ryobi North America, Easley, S.C.

[21] Appl. No.: 689,332

[22] Filed: Aug. 8, 1996

[51] Int. Cl.⁶ .................. B23C 1/20; B23B 45/00
[52] U.S. Cl. .................. 409/182; 409/137; 409/175; 144/136.95; 144/48.6
[58] Field of Search .............. 144/252.1, 154.5, 144/136.95, 372, 48.6; 409/182, 137, 181, 175

[56] References Cited

U.S. PATENT DOCUMENTS

| | | | |
|---|---|---|---|
| 1,923,159 | 8/1933 | McLaren | 409/137 |
| 2,888,965 | 6/1959 | Phillips | 144/136.95 |
| 3,022,806 | 2/1962 | Johnston | 144/252 |
| 3,162,221 | 12/1964 | Lacey | 144/136.95 |
| 3,285,135 | 11/1966 | Shaw | 144/136.95 |
| 3,288,183 | 11/1966 | Eisbrenner | 144/136.95 |
| 3,581,787 | 6/1971 | Bane | 144/134 |
| 3,762,452 | 10/1973 | Bernald | 409/182 |
| 3,958,893 | 5/1976 | Boyajian | 408/112 |
| 4,051,880 | 10/1977 | Hestily | 144/252 |
| 4,290,464 | 9/1981 | Marsan | 409/182 |
| 4,314,782 | 2/1982 | Beekenkamp | 408/16 |
| 4,403,457 | 9/1983 | Zerbe | 51/170 |
| 4,409,699 | 10/1983 | Moorhouse | 15/415 |
| 4,470,439 | 9/1984 | Sanders | 144/136 |
| 4,572,715 | 2/1986 | Wolff | 409/180 |
| 4,606,685 | 8/1986 | Maier et al. | 409/137 |
| 4,613,261 | 9/1986 | Maier et al. | 409/137 |
| 4,729,698 | 3/1988 | Haddon | 144/48.6 |
| 4,742,855 | 5/1988 | Hartley | 144/252 |
| 4,770,573 | 9/1988 | Monobe | 144/136.95 |
| 4,821,365 | 4/1989 | Charters | 15/339 |
| 5,031,678 | 7/1991 | Remmele | 144/252 |
| 5,308,201 | 5/1994 | Wilson et al. | 409/182 |
| 5,311,914 | 5/1994 | Stornetta | 144/372 |
| 5,509,454 | 4/1996 | Giacometti | 144/252 |
| 5,584,620 | 12/1996 | Blickhan et al. | 409/182 |

*Primary Examiner*—Daniel W. Howell
*Assistant Examiner*—Christopher Kirkman
*Attorney, Agent, or Firm*—Brooks & Kushman P.C.

[57] ABSTRACT

A router attachment is provided for converting a small hand-held rotary cutting tool into a miniature router. The attachment has a base having a planar lower surface, a central aperture, an upright column and a handle. A tool holder slidably mounted on the upright column is provided with a clamp for affixing the rotary cutting tool thereto. A height adjustment mechanism enables the user to adjust the height of the tool holder relative to the base planar lower surface and a lock mechanism releasably locks the tool holder to the base column during use.

10 Claims, 3 Drawing Sheets

ROUTER ATTACHMENT

TECHNICAL FIELD

The present invention relates to a router attachment for converting a small hand-held rotary tool into a miniature router.

BACKGROUND ART

Although routers are frequently found in many modern home workshops, many router owners cannot conveniently perform detailed, delicate routing operations, either due to the bulk and size of the router or the lack of small router bits. There have been various efforts in the past to convert a rotary drill or other rotary power tools into a miniature drill press, a pad sander or a router-like device as illustrated in U.S. Pat. No. 3,958,893, 4,314,782 and 4,403,457. The various prior attempts to convert a small hand-held rotary tool into a router have resulted in a product with clearly inferior performance to a traditional router so that an operator can use existing small cutting tools to perform detailed wood work.

SUMMARY OF THE INVENTION

There exists a need for a miniature router for use in small detailed routing projects. Thus it is an object of the present invention to provide a router attachment for converting a small hand-held rotary cutting tool into a low-cost, full-function router.

It is a further object of the present invention to provide a router attachment which enables the operator to vary the height of the rotary cutting tool relative to the workpiece with precision.

It is another object of the present invention to provide a router attachment with dust collection capability.

Accordingly, a router attachment is provided for converting a small hand-held rotary cutting tool into a miniature router. The router attachment includes a base, a tool holder, a height adjustment mechanism, and a locking mechanism. The base has a planar lower surface for engaging a workpiece and is provided with a central aperture extending therethrough through which the cutter of the rotary tool extends. An upright column forming a guideway projects perpendicularly upward from the planar lower surface. The base is further provided with at least one handle so that the operator can position the router attachment to the workpiece. The tool holder securely clamps to the rotary tool and is provided with a slide cooperating with the base guideway orienting the rotary cutting tool along a central axis perpendicular to the planar lower surface of the base. A height adjustment mechanism moves the tool holder axially relative to the base using an adjustment screw. A locking mechanism releasably affixes the tool holder to the column of the base to securely maintain the orientation of the rotary cutting tool relative to the base during use.

BEST MODE FOR CARRYING OUT THE INVENTION

Figure 1:
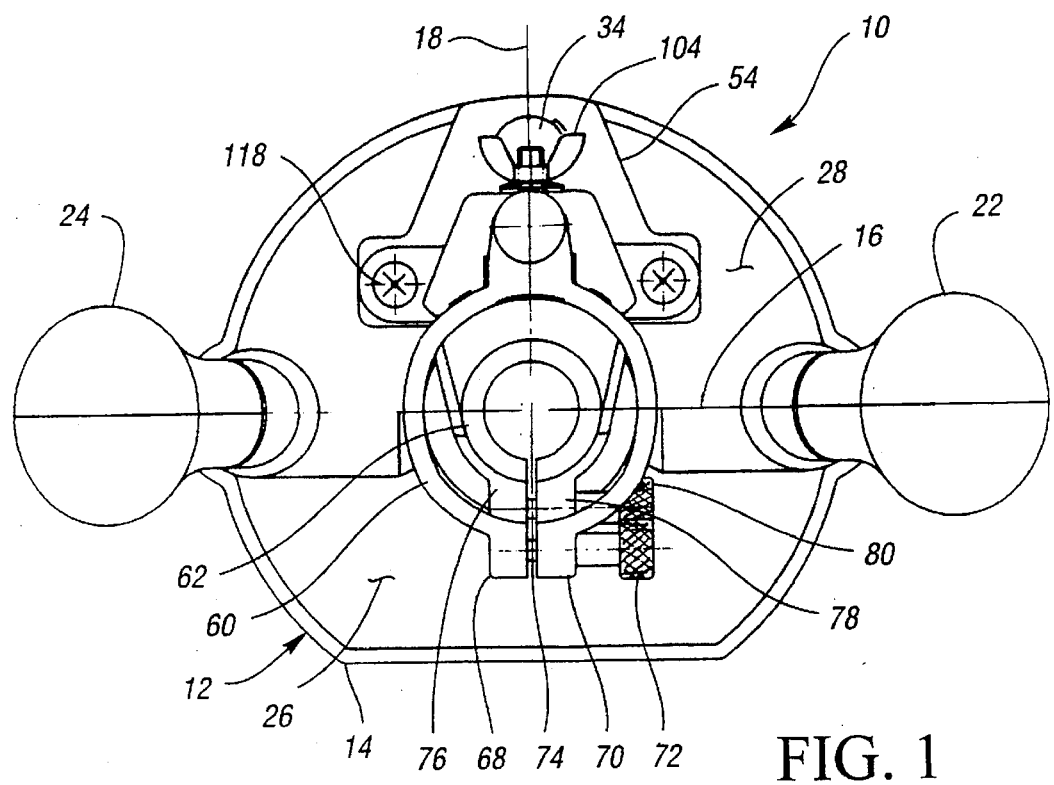
FIG. 1 is a top plan view of the router attachment.
Figure 2:
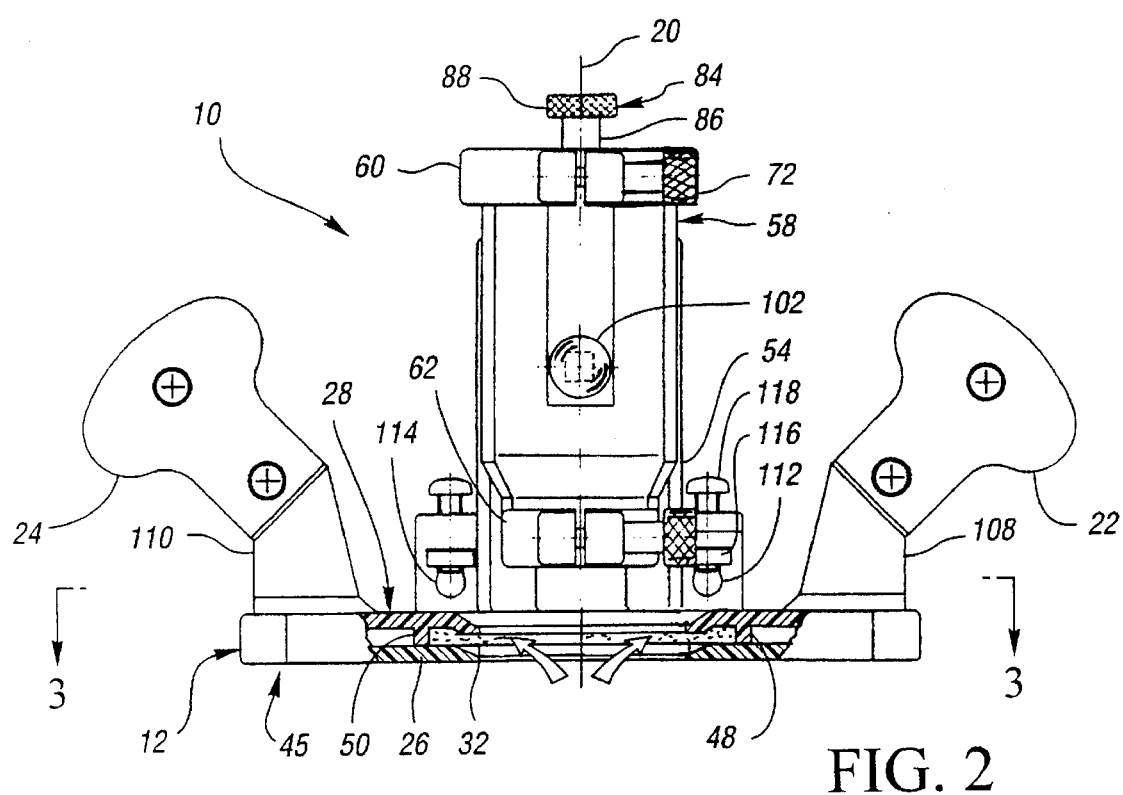
FIG. 2 is a partially cutaway side elevational view.

A preferred embodiment of the router attachment 10 is illustrated in FIGS. 1–6. As illustrated in FIG. 1, the router attachment is provided with a generally D-shaped base assembly 12 having a flat guide surface 14 aligned parallel and spaced from longitudinal axis 16. Base assembly 12 is substantially symmetrical about transverse axis 18 which intersects longitudinal axis 16 at central axis 20 which extends perpendicular to axes 16 and 18. Handles 22 and 24 form part of the base assembly 12 and are oriented on opposite sides of transverse axis 18 as illustrated.

Figure 3:
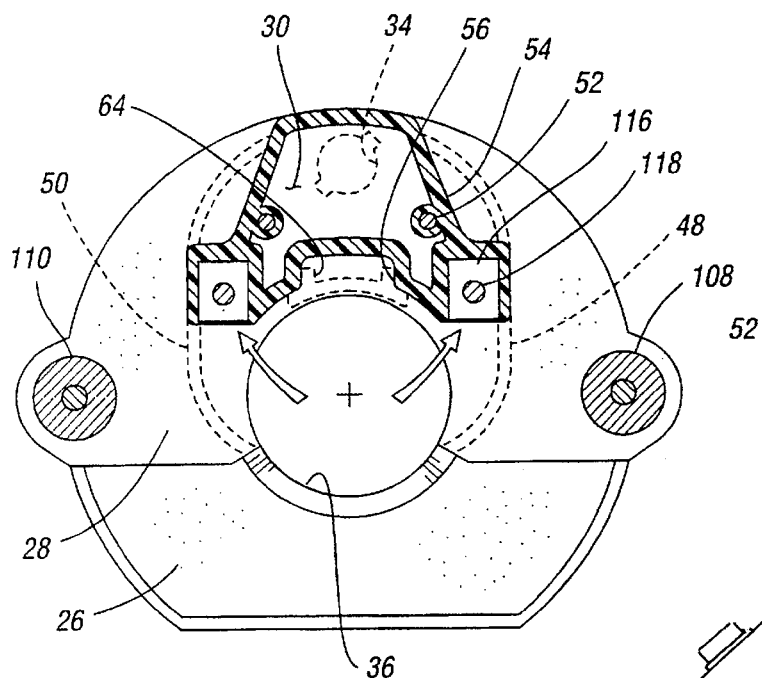
FIG. 3 is a cross-sectional view taken along line 33 of FIG. 2.
Figure 4:
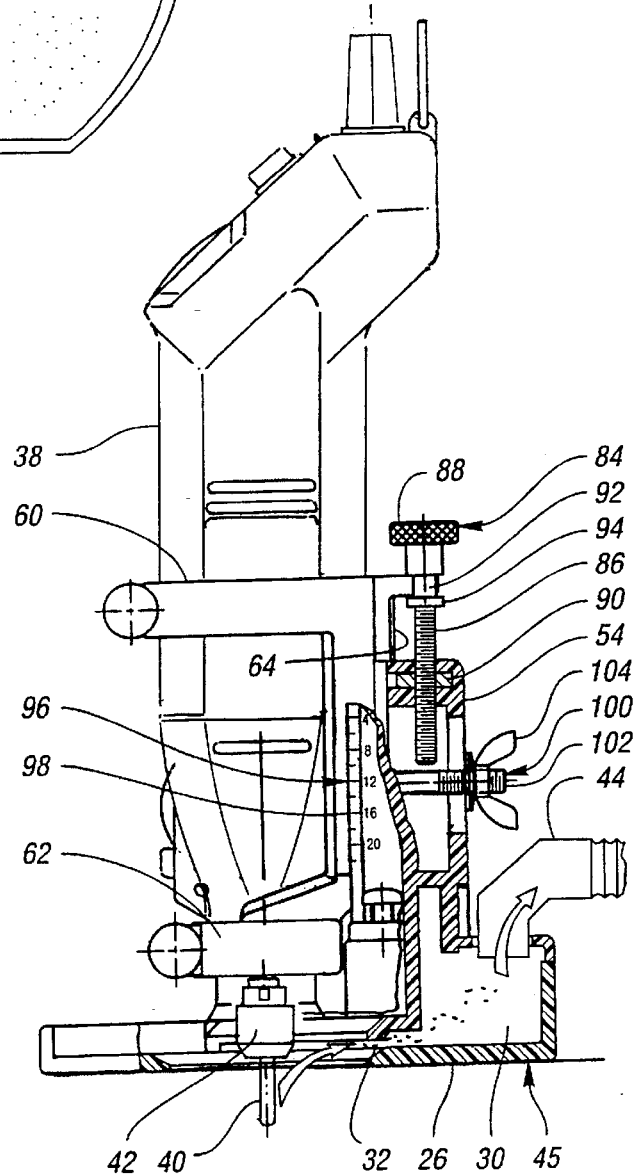
FIG. 4 is a partially cutaway side elevational view showing the orientation of the router attachment relative to a rotary cutting tool and a dust collection hose.

Base assembly 12 is formed of two main sections, base lower 26 and base upper 28, which are spaced relative to one another and define therebetween an internal cavity 30 to facilitate dust collection. Cavity 30, best seen in FIGS. 3 and 4, is provided with an inlet 32 and an outlet 34. Base assembly 12 has a central aperture 36 formed therethrough. Inlet 32 forms a semi-annular opening extending about a portion of the periphery of the central aperture. Preferably, inlet 32 extends about more than 50% and less than 75% of the central aperture periphery and most preferably about approximately 60–70% of the central aperture periphery.

Figure 5:
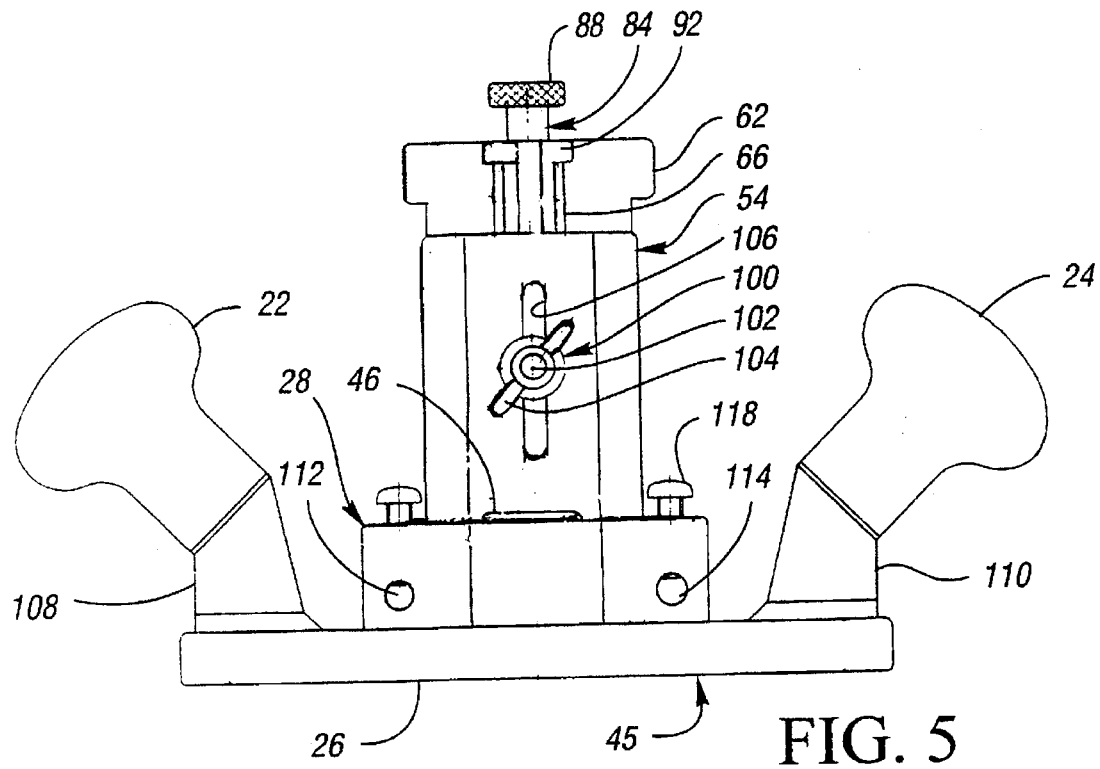
FIG. 5 is a rear view of the invention.

When the router attachment 10 is in use, the rotary tool 38 is affixed to the router attachment as illustrated in FIG. 4 with cutter 40 mounted in rotary tool chuck 42. Cutter 40 extends below the lower planar surface 45 to extend into the workpiece, not shown, to be cut. When in use, the cutter 40 will generate fine woodchips which will be ingested into inlet 32. Vacuum hose 44 connects to dust outlet 34 as illustrated in FIG. 4 and connects internal cavity 30 to a remote vacuum. Preferably, vacuum hose 44 is provided with a bayonet-type connector and dust outlet 34 has a corresponding bayonet-type aperture so that the hose 44 can be securely affixed to the router attachment 10 during use. When vacuum hose 44 is not affixed to dust outlet 34, preferably removable cap 46, shown in FIG. 5, is installed over dust outlet 34 for aesthetic reasons.

Internal cavity 30 is bounded on its outer perimeter by a pair of ribs 48 and 50 illustrated in phantom outline in FIG. 3. Ribs 48 and 50 serve to guide the dust collected from the central aperture 36 to dust outlet 34.

Figure 6:
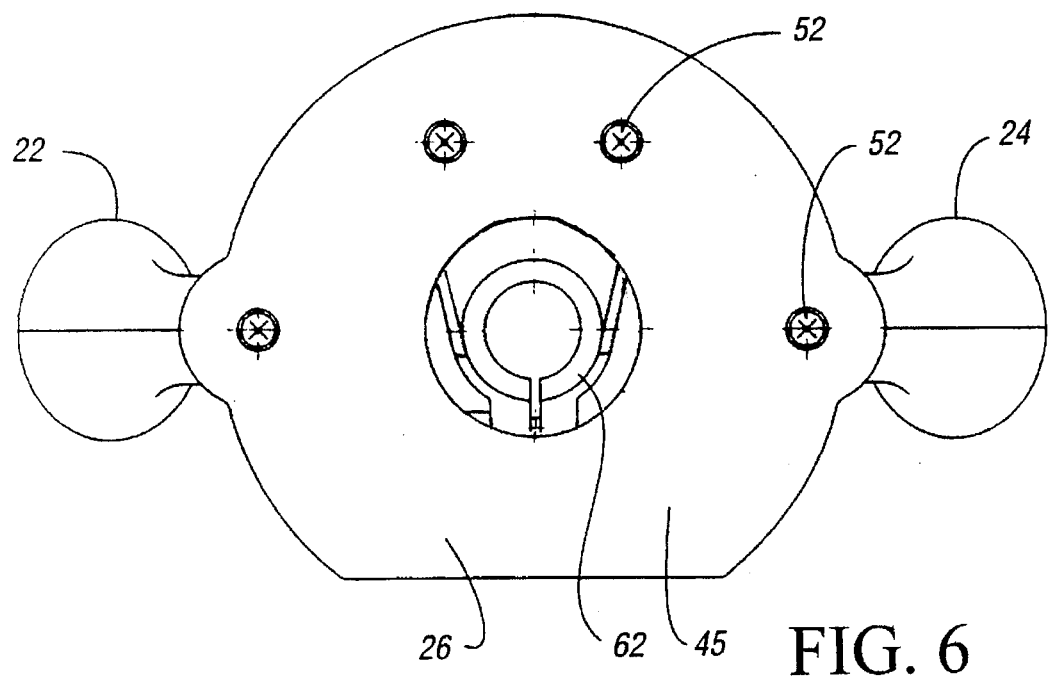
FIG. 6 is a bottom plan view of the invention.

Base upper 28 is attached to base lower 26 using four self-tapping screws 52, illustrated in FIGS. 3 and 6. Two screws are located in the region of handles 22 and 24. Two screws are located in the region of upright column 54.

Upright column 54 is oriented on transverse axis 18, adjacent central aperture 36. Column 54 extends generally perpendicular to lower planar surface 45 and is provided with a guideway surface 56. Tool holder 58 is positionable at various vertical orientations relative to column 54. Tool holder 58 is provided with upper and lower clamp rings 60 and 62 for affixing the tool holder 58 to rotary tool 38 at two axially spaced apart positions. Upper and lower clamp rings 60 and 62 orient central axis 20 of the rotary tool 38 perpendicular to planar lower surface 45. A pair of ribs 64 and 66 are provided on tool holder 58 for cooperation with guideway surface 56 on column 54 in order to maintain alignment of tool holder 58 and column 54.

Upper and lower clamp rings 60 and 62 are of a split ring design as shown in FIG. 1. Clamp ring 60 is provided with a pair of spaced apart tabs 68 and 70 which are urged together by rotation of knob 72, which is a knurled knob which engages bolt 74 having a hexagonal head recessed within tab 68 to prevent it from rotating relative thereto. The user of the router attachment by tightening knob 72 can cause upper clamp ring 60 to securely grasp the rotary tool 38 in the position illustrated in FIG. 4. Lower clamp ring is similarly provided with a pair of tabs 76 and 78 which are urged toward one another by knob 80, which cooperates with a corresponding bolt affixed to tab 76. Of course, a wide variety of conventional clamp-type fastening mechanisms can be used to secure tool holder 58 to rotary tool 38, such as conventional band clamps, C-clamps or the like.

Router attachment 10 is provided with a height adjustment mechanism 84 for axially moving tool holder 58 vertically relative to base assembly 12. Height adjustment mechanism 84 includes an adjustment screw 86 having an knurled knob 88 rotatable by the operator. Height adjustment screw 86 in the preferred embodiment threadingly engages nut 90, mounted in column 54, and engages fork 92 on tool holder 58. Adjustment screw 86 can freely rotate relative to fork 92. However, fork 92 is axially positioned between knob 88 and collar 94 so that rotation of the adjustment screw by the operator causes the adjustment screw to move axially relative to the column and in turn fork 92, which is trapped between knob 88 and collar 94, moves axially with the adjustment screw relative to column 54. For convenience of the operator to gauge the movement of the tool holder 58 relative to base assembly 12, an alignment mark 96 is provided on tool holder 58 and scale indicia 98 provided on column 54 as illustrated in FIG. 4.

Router attachment 10 is further provided with a lock mechanism 100 for affixing the relative position of the tool holder 58 to column 54 of base assembly 12. In the preferred embodiment of the invention, lock mechanism 100 is provided by carriage bolt 102 and wing nut 104. Carriage bolt 102 is affixed to tool holder 58 and extends through a rectangular opening shown in phantom outline in FIG. 2. Carriage bolt 102 is prevented from rotating relative to tool holder 58 and extends along transverse axis 18 as illustrated in FIGS. 1 and 4. Column 54 is provided with an elongated axial slot 106, shown in FIG. 5, sized to allow carriage bolt 102 to translate vertically therethrough. When the tool holder is properly positioned relative to the column to achieve the desired cutter depth, the operator tightens wing nut 104 causing carriage bolt 102 to be loaded in tension securely but releasably affixing tool holder 58 to column 54.

In order to increase the operator's visibility of the workpiece, in the preferred embodiment of the invention base lower 26 is formed of transparent polycarbonate which is clear or slightly tinted. The clear base lower 26 provides ample structural support for the workpiece without hindering the operator's view. In the preferred embodiment, base upper 28 is formed of an opaque material having good structural characteristics. Base upper 28 can be formed of glass filled polypropylene to obtain excellent structural integrity with no post-molding machining and relatively low incremental part cost. It is important that base upper 28 be structurally rigid as it serves to orient column 54 relative to planar lower surface 45. Similarly, base upper 28 provides an attachment for handles 22 and 24, which in the preferred embodiment are each formed by a pair of sections affixed to upstanding arms 108 and 110, which are part of the base upper 28.

Base upper 28 is preferably provided with a pair of apertures 112 and 114 for receiving a pair of guide bars, not shown, which are part of an edge guide. Each of the apertures 112 and 114 are provided with a guide bar nut 116 and a locking screw 118 to allow the operator to adjust the transverse orientation of the guide bars relative to longitudinal axis 16.

Having now fully described the invention, it will be apparent to one of ordinary skill in the art that many changes and modifications can be made thereto without departing from the spirit or scope of the invention as set forth herein.

What is claimed is:

1. A router attachment for use with a small hand-held rotary cutting tool enabling an operator to use the rotary cutting tool as a miniature router, the router attachment comprising:

a base having a planar lower surface for engaging a workpiece, a central aperture extending through the planar lower surface, an upright column forming a U-shaped guideway oriented perpendicular to the planar lower surface, and a handle for an operator;

a tool holder having a clamp for removably attaching a rotary cutting tool having a tool chuck rotatable about a central axis, and a slide comprising a rib parallel to the central axis cooperating with the guideway for orienting the central axis of the rotary cutting tool perpendicular to the planar lower surface of the base;

a height adjustment mechanism for moving the tool holder axially relative to the base, including an adjustment screw for rotation by the operator, a threaded member affixed to one of the tool holder and base cooperating with the adjustment screw and an engagement member affixed to the other one of the tool holder and base for cooperation with the adjustment screw so that the rotation of the adjustment screw by the operator causes the tool holder to move axially relative to the base; and a lock mechanism for releasably affixing the tool holder to the column of the base to maintain the position of the rotary cutting tool relative to the planar lower surface of the base when the rotary cutting tool is in use and permitting the tool holder to be released relative to the column so that the operator can adjust the position of the rotary cutting tool utilizing the height adjustment mechanism.

2. The router attachment of claim 1 wherein the base is provided with a pair of handles spaced from one another on opposite sides of the central axis of the rotary cutting tool.

3. The router attachment of claim 1 wherein the base is formed of an upper section and a lower section which define therebetween a dust collection internal cavity having an inlet which at least partially surrounds the central aperture formed in the base and an outlet spaced therefrom for connection to a remote vacuum source.

4. The router attachment of claim 3 wherein the base upper section is smaller in axial top plan view than the base lower section and extends only partially about the central aperture to define a semi-arcuate inlet opening.

5. The router attachment of claim 4 wherein the base lower section is formed of a transparent plastic material to allow the operator to view the workpiece through the base lower section in the region not covered by the base upper section.

6. The router attachment of claim 1 wherein the base is formed of a base lower section formed of a transparent plastic material and a base upper section which is smaller in top plan view than the base lower section and extends only partially around the central aperture to allow the operator to view the workpiece through the base lower section in the region not covered by the base upper section.

7. A router attachment for use with a small hand-held rotary cutting tool enabling an operator to use the rotary cutting tool as a miniature router, the router attachment comprising:

a base assembly having a base lower section formed of a transparent plastic material having a planar surface for engaging a workpiece, a central aperture extending therethrough, and a base upper section which is smaller than the base lower section in axial plan view, the base lower section extending only partially around the central aperture, the base upper section formed of a structurally rigid material and having an upright column forming a U-shaped guideway oriented perpendicular to the planar lower surface and at least one handle for an operator, the base upper and lower sections collectively defining therebetween a dust collection internal cavity having an inlet which partially surrounds the central aperture and an outlet spaced therefrom for connection to a remote vacuum source;

a tool holder having a clamp for removably attaching a rotary cutting tool having a tool chuck rotatable about a central axis, and a slide comprising a rib parallel to the central axis cooperating with the guideway for orienting the central axis of the rotary cutting tool perpendicular to the planar lower surface of the base;

a height adjustment mechanism for moving the tool holder axially relative to the base, including an adjustment screw for rotation by the operator, a threaded member affixed to one of the tool holder and base cooperating with the adjustment screw and an engagement member affixed to the other one of the tool holder and base for cooperation with the adjustment screw so that the rotation of the adjustment screw by the operator causes the tool holder to move axially relative to the base; and a lock mechanism for releasably affixing the tool holder to the column of the base to maintain the position of the rotary cutting tool relative to the planar lower surface of the base upper section when the rotary cutting tool is in use and permitting the tool holder to be released relative to the column so that the operator can adjust the position of the rotary cutting tool utilizing the height adjustment mechanism.

8. The router attachment of claim 7 wherein the threaded member of the height adjustment mechanism is a nut insert which is affixed to the column of the base and the engagement member is a fork formed on the tool holder cooperating with the adjustment screw where the screw can rotate freely relative to the fork with the fork and the adjustment screw moving axially in unison as the user rotates the adjustment screw.

9. The router attachment of claim 7 wherein the lock mechanism further comprises a bolt affixed to the tool holder and extending generally parallel to the planar lower surface projecting through a slot formed in the column of the base upper section and the threaded fastener engaging the bolt to clamp the tool holder to the column of the base.

10. The router attachment of claim 7 wherein the tool holder is provided with a pair of axially spaced apart split ring type clamps for grasping the rotary cutting tool at axially spaced apart locations.

* * * * *

UNITED STATES PATENT AND TRADEMARK OFFICE
CERTIFICATE OF CORRECTION

PATENT NO. : 5,662,440
DATED : September 2, 1997
INVENTOR(S) : Kikuchi et al.

It is certified that error appears in the above-identified patent and that said Letters Patent is hereby corrected as shown below:

Column 5, lines 5-6, after the word "extending" delete "the through" and insert --therethrough--.

Signed and Sealed this

Twenty-fourth Day of March, 1998

Attest:

BRUCE LEHMAN

Attesting Officer

Commissioner of Patents and Trademarks